July 7, 1970   N. A. TINER ET AL   3,518,872
IMPACT FRICTION TESTER

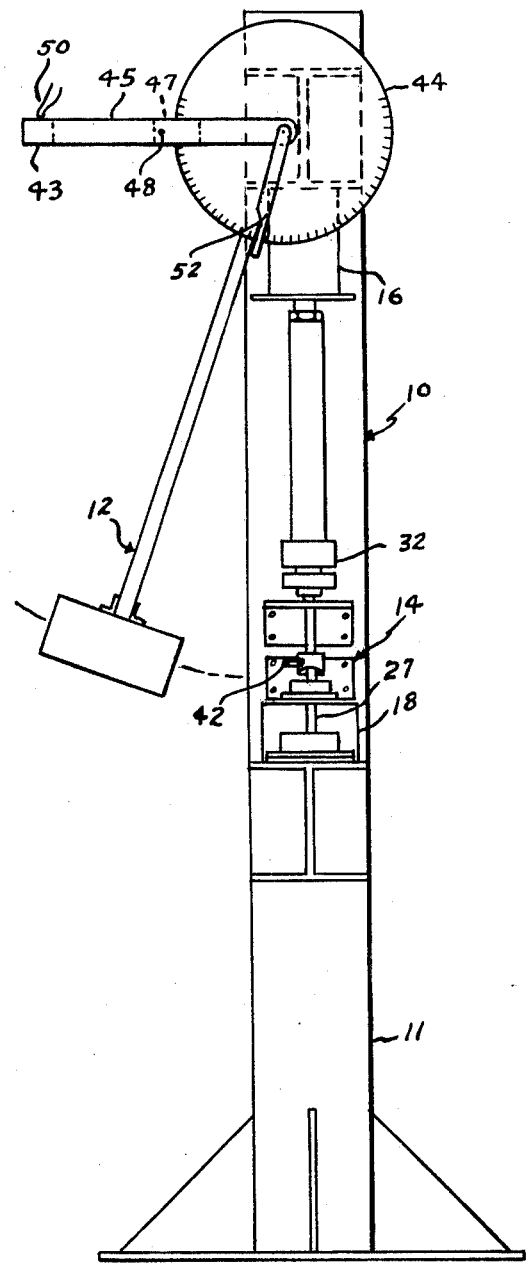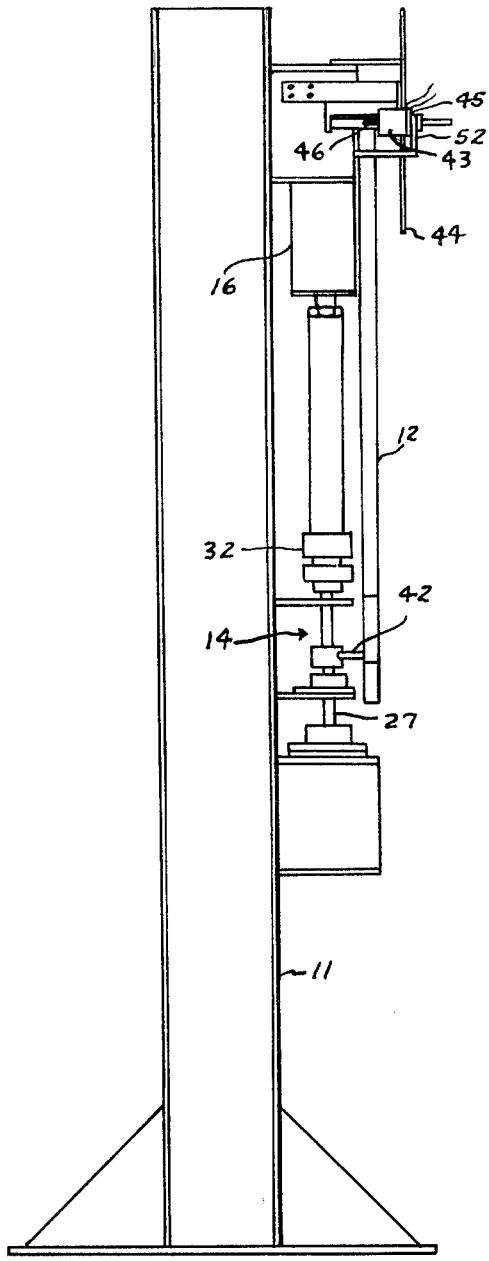

Filed June 27, 1969   2 Sheets-Sheet 2

INVENTORS
NATHAN A. TINER
LON E. BELL
BY STEPHEN M. TOY
Harry A. Herbert Jr
ATTORNEY
Richard J Killoren
AGENT United States Patent Office 3,518,872
Patented July 7, 1970

1

3,518,872
IMPACT FRICTION TESTER
Nathan A. Tiner, Laguna Beach, Lon E. Bell, Pasadena, and Stephen M. Toy, Orange, Calif., assignors to the United States of America as represented by the Secretary of the Air Force
Filed June 27, 1969, Ser. No. 837,070
Int. Cl. G01n 19/02
U.S. Cl. 73—9                              5 Claims

ABSTRACT OF THE DISCLOSURE

A friction impact tester having a pin specimen which is rotated on a plate specimen has the energy supplied to the test system from a pendulum by means of an arm and latch mechanism which controls the angle through which the pin specimen is rotated. The pin and plate specimens are placed in a double moat with the liquid propellant, to be tested, placed in the first moat surrounding the specimens and with a liquid coolant supplied to the second moat which surrounds the first moat.

BACKGROUND OF THE INVENTION

In the design of storage tanks for liquid propellants, tests are needed to determine the energy level required to initiate a reaction. Impact testers have been used for evaluating materials in propellants under various impact conditions; however they are not suitable for obtaining all design data.

To measure friction energy loss between two sliding surfaces under high impact velocities, the present impact testers impart a large amount of plastic strain energy, but less than 5% sliding friction energy to the sample.

Current friction testing based on rotating measurement principles release large amounts of energy during the initial portion of the cycle between static conditions and high steady state velocities and during the final portion of the cycle between steady state velocities and zero stopping time. This introduces large errors to frictional loss measurement of high impact velocity.

BRIEF SUMMARY OF THE INVENTION

According to this invention a system is provided wherein a pin specimen is rotated on a plate specimen. A load is applied to the pin specimen by means of a pneumatic cylinder. The specimens are placed in a double moat wherein the first moat which surrounds the test specimens contains the liquid propellant to be tested and the second moat, which surrounds the first moat, contains a coolant such as a liquid nitrogen. Energy is supplied to the test system from a pendulum which rotates the pin specimen on the plate specimen. An arm and latch mechanism controls the angular movement of the pin specimen. The test system of teh invention imparts less than 12% plastic strain energy to the test sample with the remainder as sliding friction energy. Also the device of this invention reduces the energy loss in the initial and final periods to negligible amounts. With this tester frictional energies of varying contact pressures and sliding velocities can be imparted to the test sample with ease. Also the tester of the invention is adaptable with ease to extreme environmental conditions with hazardous propellants from room temperature to cryogenic temperatures.

BRIEF DESCRIPTION OF THE DRAWING

FIG. 1 is a front elevational view of a frictional tester according to the invention;
FIG. 2 is a side view of the device of FIG. 1.

2

Figure 4:
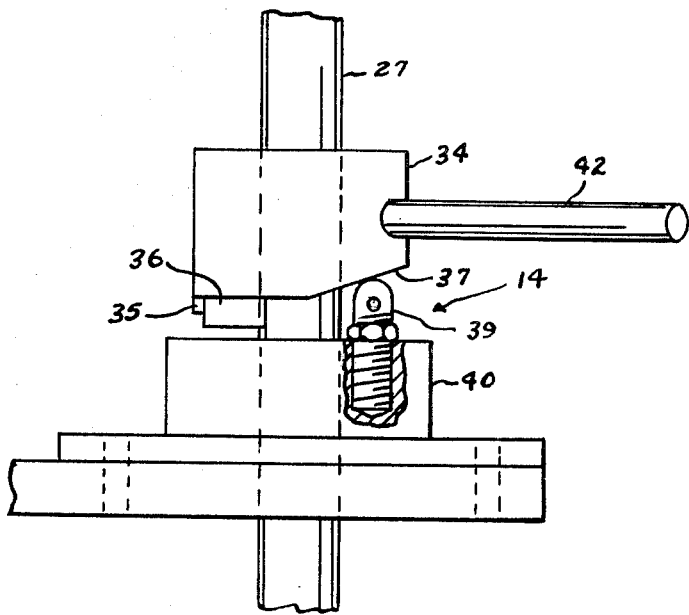

FIG. 4 is an enlarged view of the arm and latch mechanism for the device of FIG. 1.

BRIEF DESCRIPTION OF THE INVENTION

Referring now to FIG. 1 of the drawing, the frictional tester 10 has a test stand support member 11 which supports a pendulum 12, an arm and latch mechanism 14, a pneumatic cylinder 16, and a test section 18.

Figure 3:
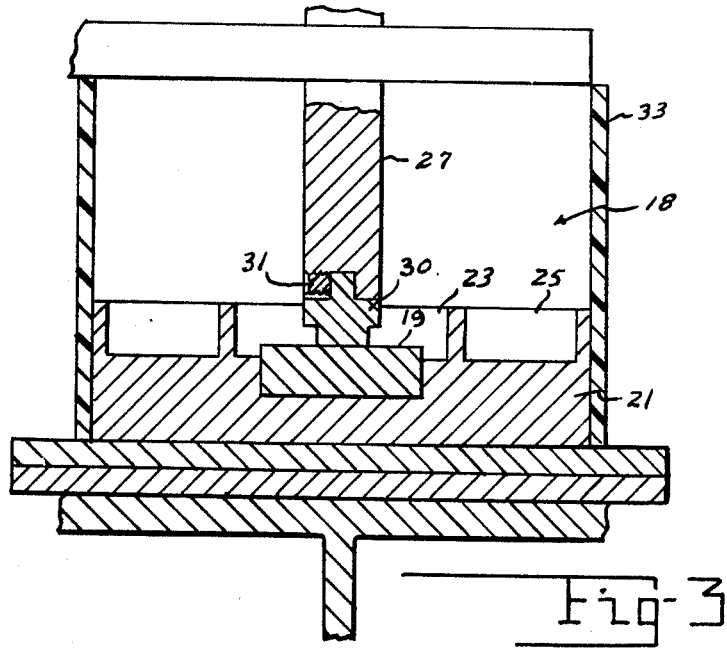
FIG. 3 is an enlarged partial sectional view of the test section for the device of FIG. 1.

The test section 18, shown in greater detail in FIG. 3, has a plate specimen 19 located in a specimen holder 21. The specimen holder 21 has a circular depression 23 surrounding the specimen and an annular depression 25 surrounding the circular depression 23. When in use the depression 23 holds a test fluid, such as $ClF_5$ and the second depression 25 holds a liquid coolant, such as liquid helium. A test rod 27 extends from a thrust bearing 32 through the arm and latch mechanism to a position adjacent specimen 19. A pin specimen 30 is secured to the test rod 27 by means of a set screw 31. A plastic shield 33 surrounds the test chamber so that various atmospheres may be maintained in the test section. The Teflon thrust bearing 32 is positioned between the pneumatic cylinder 16 and the test rod 27 to permit rotation of the test specimen 30 against test specimen 19.

The arm and latch mechanism 14, shown in greater detail in FIG. 4, has a collar member 34 which surrounds the test rod 27 and has a downwardly extending projection 35 which normally engages a pin 36 secured to the rod 27. A cam surface 37 on the member 34 engages an adjustable stud 39 secured to support 40. A projecting arm 42 adapted to be engaged by pendulum 12 is secured to member 34. The operation of the pendulum is substantially the same as in the Izod impact testing apparatus, as described in Part 30, pages 237–240, of ASTM Standards, May, 1966. The energy is supplied to the test specimen by pendulum 12. The energy imparted to the test specimen is computed by calculating the difference between the pendulum's initial height and its final heights. This gives the total energy released during its swing.

The pendulum's initial and final heights may be measured directly or may be determined from angular markings placed on a dial 44. A solenoid 43 held by arm 45 may be used to secure the pendulum in any desired initial position. A plate member indicated at 47 which is positioned behind arm 45 may be clamped to the dial 44 by set screw 48 to angularly position the solenoid 43. The signal to release the pendulum would be supplied to leads 50.

A follower arm 52 is moved by the pendulum to indicate the final angular position of the pendulum. Calibration markings indicating height for any particular pendulum may be provided on the dial 44. If different weight or length pendulums are used, which change the effective length of the pendulum, different calibration markings would be required. The energy dissipated in the apparatus must be subtracted from the total energy released to determine the energy imparted to the specimen.

The energy $e_f$ consumed in friction can be measured if $e_i$, the total energy released during the pendulum swing and the energy loss L are known.

By knowing the force F, the coefficient of friction $\mu$ and the angular distance traveled $\theta$, the force $e_f$ can be determined when the upper test specimen is a ring member having an inside diameter $R_1$ and an outside diameter $R_2$.

$$e_f = \mu F \theta (R_1 + R_2) \frac{\pi}{360} \qquad (1)$$

For a solid specimen, as shown, with a radius R this expression would be $$e_f = \mu F \theta R \frac{\pi}{360} \qquad (2)$$

By using a Teflon thrust bearing the loss function L changes very little with changes in the force applied by the pneumatic cylinder 16. By using Teflon specimens with a coefficient of friction of .04 the loss function L was found to be 9.2±0.3 ft. lbs. for the device built.

In the operation of the device the specimen 19 is placed in the recess in specimen holder 21 and the specimen 30 is secured to the test rod 27. The test fluid is supplied to depression 23 and the coolant is supplied to depression 25. The shield which may, for example, be in the form of two semicylindrical sections, is placed around the test section. A seal may be provided if required. The proper load is supplied by the pneumatic cylinder 16 in a conventional manner such as by supplying air of predetermined pressure to the cylinder from a source, not shown. The stud 39 is adjusted to provide the desired angular rotation for the specimen 30. The arm 45 is then located in the desired position clamping the dial 44 between plate member 47 and arm 45.

Since some tests take place with dangerous combinations of specimens and test fluids, solenoid 43 is sometimes operated from a remote location. Operation of the solenoid withdraws solenoid plunger 46 to permit the pendulum 12 to swing past the arm and latch mechanism 14. When the pendulum strikes the arm 42 the specimen is immediately brought to the pendulum velocity. The average velocity of the specimen may be determined from the initial and final height of the pendulum by using the equation $$V=\sqrt{2_g h} \qquad (3)$$

With the initial and final velocities determined in this manner the average velocity is readily determined.

After the pendulum strikes the arm 42 the collar member 34 rides up on test rod 27 under the influence of cam surface 37 and the adjustable stud 39. When the projection 35 clears pin 36 the collar member 34 continues to rotate and test rod 27 stops. The collar member 34 rotates until pendulum 12 clears arm 42. The pendulum then moves to its final heights as determined by the energy remaining in the pendulum. The follower arm 52 indicates this position. Since arm 42 has been moved out of the way on the forward movement of the pendulum, the pendulum will not further affect the test rod 27 and the pendulum will in time come to rest.

The energy supplied to the sample may then be determined from the height difference ΔH and the weight of the pendulum W as follows:

$$\Delta H = H_1 - H_2 \qquad (4)$$
$$e_i = \Delta H W \qquad (5)$$
$$e_f = e_i - L \qquad (6)$$

where $H_1$=initial height of pendulum
$H_2$=final height of pendulum.

In one test that produced a reaction between specimens of Ti–6A1–4V(ELI) alloy and liquid $ClF_5$, with specimen 30 having a contact area of .047 sq. in., ΔH was 1.35 ft. With a 20 lb. weight on the pendulum $e_i$ equals 27 ft. lbs. and $e_f$ equals 27−9.2=17.8 ft. lbs.

The rate of energy transfer to the sample $X_f$ was calculated from the relation:

$$X_f = \frac{\Delta e_f}{A \Delta_r} \qquad (7)$$

where $$\Delta_r = \frac{U}{V} \qquad (8)$$

and

A=contact area where

U=distance traveled
V=average velocity.

For the above the energy transfer rate for the sample tested was found to be $1.2 \times 10^4$ ft. lbs./sec.

By using expressions (1) or (2), depending on the type of specimen used, the device may be used to determine the coefficient of friction for unknown test specimens. The test specimens 19 and 30 may be the same or different materials.

There is thus provided a friction energy tester that imparts a large amount of sliding friction energy to the sample and which reduces the energy loss in the initial and final periods of the test to negligible amounts.

We claim:

1. A device for measuring frictional energy loss between two sliding surfaces, comprising: a test stand support member; a first specimen holder supported on said support member; means in said first specimen holder for retaining a first test specimen; means for holding a second test specimen in contact with said first test specimen; a pendulum, adapted to swing through a predetermined arc, supported on said test stand support member; means positioned within said arc and responsive to the impact of said pendulum for rotating the second test specimen, through a predetermined angle on said first test specimen; means for applying a force to said second test specimen to provide a predetermined contact force between the first test specimen and the second test specimen and means for indicating the initial and the final heights of said pendulum.

2. The device as recited in claim 1 wherein said means for holding said second test specimen in an elongated test rod; a projection on said test rod; said means for rotating the second test specimen being a collar member around said rod and an arm projecting from said collar to engage the pendulum; a shoulder on said collar adapted to engage the projection on said rod; a cam surface on said collar member; adjustable means, positioned adjacent and engaging said cam surface, for disengaging the shoulder on the collar member from the projection on the rod whereby said collar releases said rod after the rod has rotated through a predetermined angle.

3. The device as recited in claim 2 wherein said first specimen holder has a first recess surrounding the first specimen holding means, adapted to hold a test liquid adjacent the contacting surfaces of said first and said second specimens.

4. The device as recited in claim 3 wherein said first specimen holder has a second recess surrounding the first recess, adapted to hold a cooling liquid.

5. The device as recited in claim 4 wherein said means for applying a force to the second test specimen is a pneumatic cylinder; a low coefficient of friction bearing between said pneumatic cylinder and said test rod.

References Cited

UNITED STATES PATENTS 2,296,657  9/1942  Wallace _____ 73—9
3,209,585  10/1965  Wolstenholme et al. __ 73—12 X

OTHER REFERENCES

Technical Bulletin #99–31 dated August 1963, Westinghouse, "Westinghouse Friction Tester."

S. CLEMENT SWISHER, Primary Examiner

D. M. YASICH, Assistant Examiner